US011002482B2

(12) United States Patent
Van Keuren et al.

(10) Patent No.: US 11,002,482 B2
(45) Date of Patent: May 11, 2021

(54) DRYER FOR PREPARATION OF DRY NANOPARTICLES

(71) Applicant: Georgetown University, Washington, DC (US)

(72) Inventors: Edward Van Keuren, Herndon, VA (US); Grace Maglieri, Ridgefield, CT (US); Roman Kosarzycki, Greendale, WI (US); Leon Der, New Carrollton, MD (US)

(73) Assignee: Georgetown University, Washington, DC (US)

( * ) Notice: Subject to any disclaimer, the term of this patent is extended or adjusted under 35 U.S.C. 154(b) by 9 days.

(21) Appl. No.: 16/672,772

(22) Filed: Nov. 4, 2019

(65) Prior Publication Data

US 2020/0064065 A1    Feb. 27, 2020

Related U.S. Application Data

(62) Division of application No. 15/717,656, filed on Sep. 27, 2017, now Pat. No. 10,473,393.

(Continued)

(51) Int. Cl.
| | |
|---|---|
| *F26B 3/12* | (2006.01) |
| *B03C 3/47* | (2006.01) |
| *B01J 13/00* | (2006.01) |
| *B03C 3/017* | (2006.01) |
| *B03C 3/76* | (2006.01) |
| *B03C 3/09* | (2006.01) |
| *B03C 3/41* | (2006.01) |
| *B03C 3/12* | (2006.01) |
| *B03C 3/49* | (2006.01) |
| *F26B 17/10* | (2006.01) |
| *F26B 23/04* | (2006.01) |

(52) U.S. Cl.
CPC ............. *F26B 3/12* (2013.01); *B01J 13/0095* (2013.01); *B03C 3/017* (2013.01); *B03C 3/09* (2013.01); *B03C 3/12* (2013.01); *B03C 3/41* (2013.01); *B03C 3/47* (2013.01); *B03C 3/49* (2013.01); *B03C 3/76* (2013.01); *F26B 17/101* (2013.01); *F26B 23/04* (2013.01)

(58) Field of Classification Search
None
See application file for complete search history.

(56) References Cited

U.S. PATENT DOCUMENTS

| | | | |
|---|---|---|---|
| 2,911,036 A | 11/1959 | Lazar et al. | ....................... 159/4 |
| 2007/0113530 A1* | 5/2007 | Morozov et al. | ...... B01D 46/00 |
| | | | 55/527 |

(Continued)

OTHER PUBLICATIONS

Buchi products, Technical Data Sheets, "Nano Spray Dryer B-90," [retrieved on Oct. 4, 2016], 9 pp., Retrieved from the Internet: www.buchi.com/spray-drying.

(Continued)

*Primary Examiner* — Tam M Nguyen
(74) *Attorney, Agent, or Firm* — Dawn-Marie Bey; Bey & Cotropia PLLC

(57) ABSTRACT

A system for producing dry nanoparticles from a liquid includes a closed tubing system which incorporates a mister, heater and an electrostatic collector therein. The system is able to produce dry nanoparticles from liquid-suspensions and from solvent sol

Related U.S. Application Data

(60) Provisional application No. 62/408,892, filed on Oct. 17, 2016.

(56) References Cited

U.S. PATENT DOCUMENTS

| | | | |
|---|---|---|---|
| 2009/0044421 A1 | 2/2009 | Adiga | 34/443 |
| 2011/0129897 A1 | 6/2011 | Glover et al. | 435/196 |
| 2012/0251594 A1* | 10/2012 | Iongest et al. | A61K 9/12 424/400 |
| 2013/0015264 A1 | 1/2013 | Bazergui | 239/240 |
| 2018/0106536 A1 | 4/2018 | Van Keuren et al. | |
| 2018/0147146 A1 | 5/2018 | Eber et al. | |

OTHER PUBLICATIONS

Buchi products, Technical Data Sheets, Mini Spray Dryer B-290, [retrieved on Oct. 4, 2016], 9 pp., Retrieved from the Internet: www.buchi.com/spray-drying.

* cited by examiner

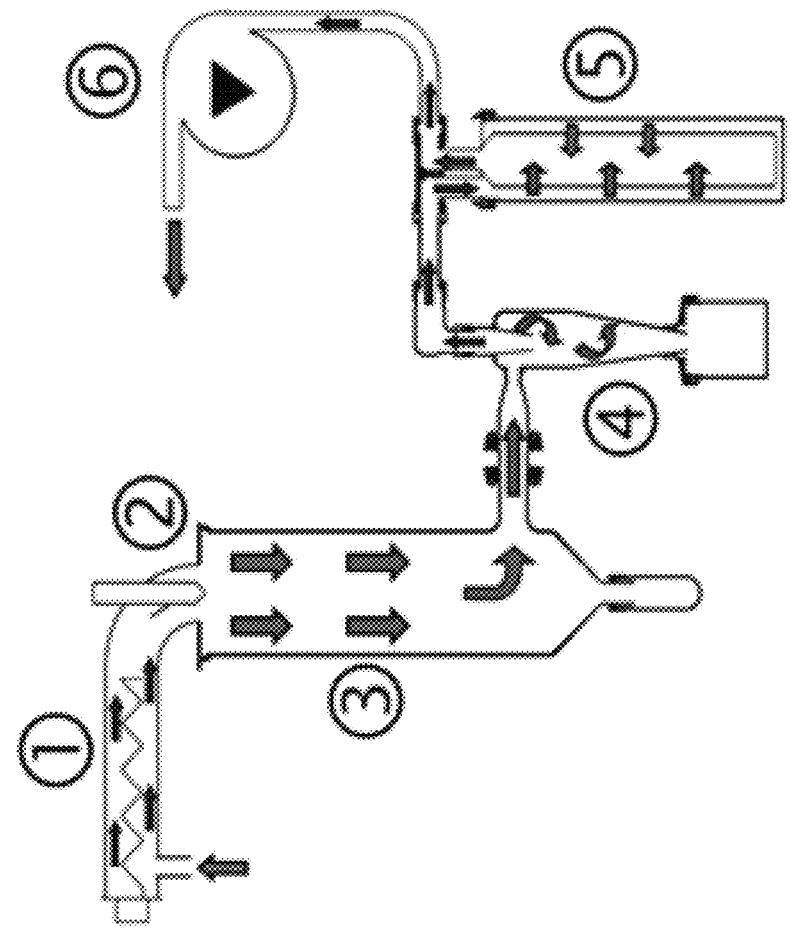
Prior Art - Figure 1b
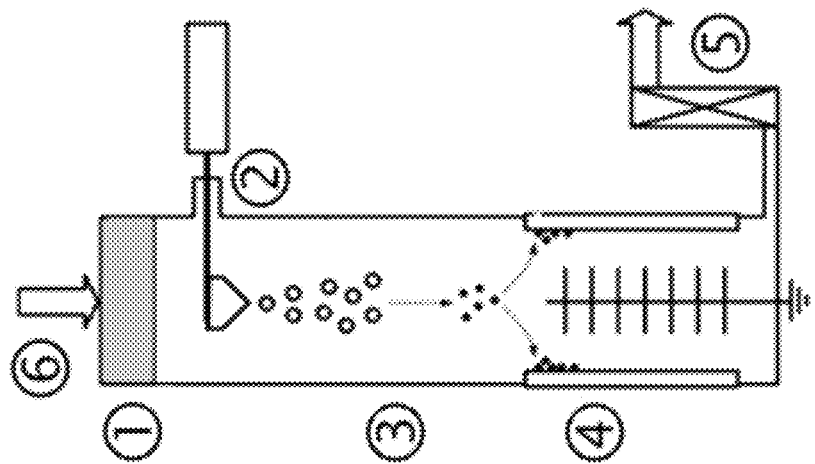
Prior Art - Figure 1a

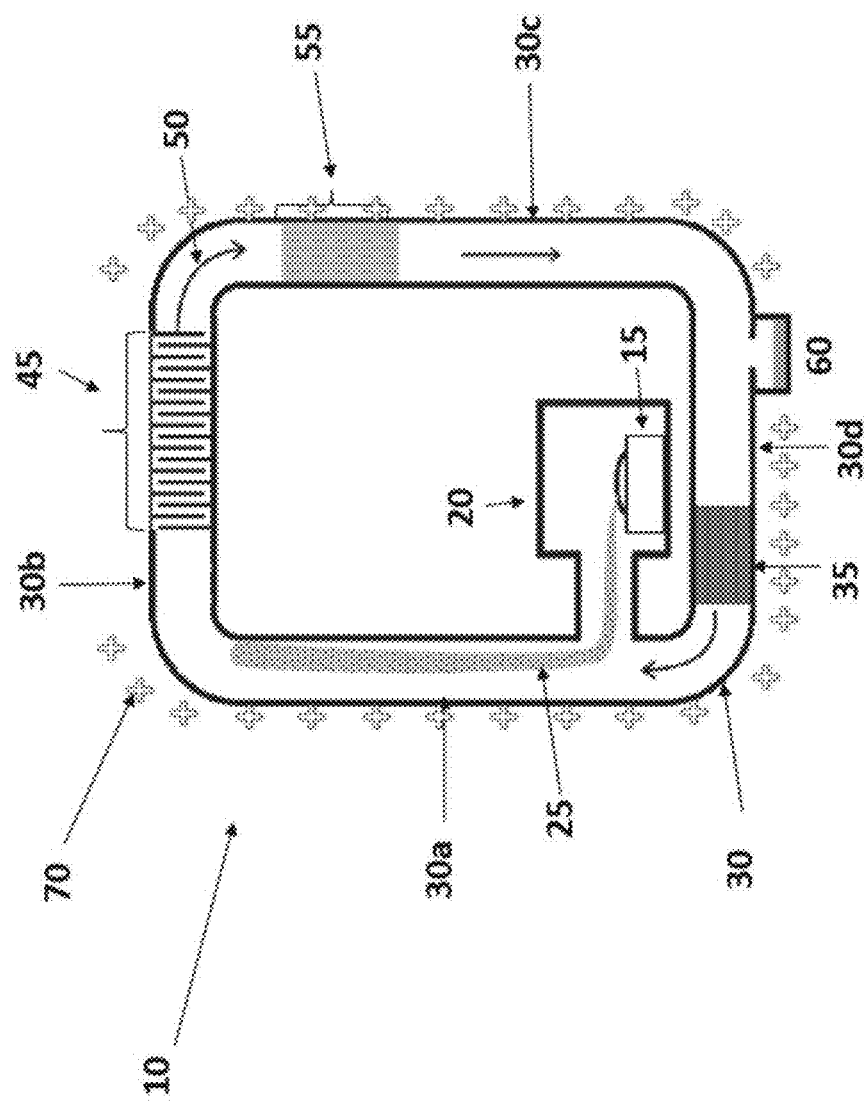

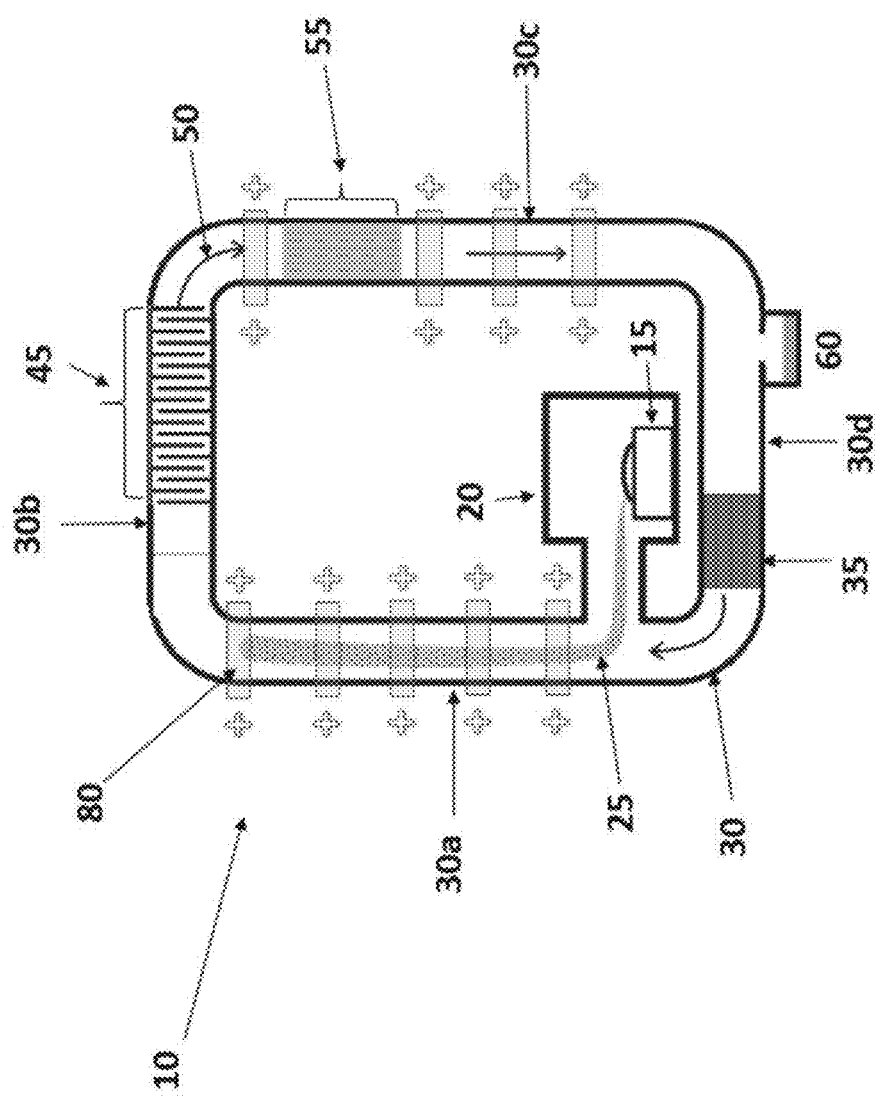

DRYER FOR PREPARATION OF DRY NANOPARTICLES

CROSS-REFERENCE TO RELATED APPLICATIONS

The present application is a division of U.S. application Ser. No. 15/717,656 filed on Sep. 27, 2017, titled "Dryer For Preparation of Dry Nanoparticles," which claims the benefit of priority to similarly titled U.S. Provisional Patent Application Ser. No. 62/408,892 filed on Oct. 17, 2016 which is incorporated herein by reference in its entirety.

BACKGROUND

Field of Embodiments

The field of invention is spray dryers for creating and/or drying nanoparticles.

Description of the Related Art

The study of various nanoparticles has been an active area of research for their potential applications in numerous fields, such as electronics, optics, biomedicine and coatings. In order to characterize and use nanoparticles, they often need to be removed from suspension without affecting the structure and attributes of the nanoparticles therein. Two known methods for accomplishing this removal include freeze drying and filtering out the solution mechanically. But these methods are either time consuming and inefficient, or worse, the methods impact the attributes of the resulting nanoparticles. Freeze drying is effective and produces little waste, but it is speculated that this process may actually change the structure of the nanoparticles, leading to changes in their physical properties. Filtering seems to be less disruptive to the particles themselves, but it can take an incredibly long time (considering the fact that it must be continuously observed) and wastes a large percentage of the particles in the solution. Therefore, there is a need in the art for an improved particle drying process that is less disruptive than freeze drying and more efficient than prior art filtering processes.

The current embodiments described here are directed to a spray drying apparatus for either creating dry powder from solutions or removing liquid from a dispersion of particles suspended in a fluid. Spray dryers are commonly used to form solid powders from solutions, or from dispersions of solid particles in a liquid. In the latter case, spray dryers may have advantages over conventional drying in terms of reducing or eliminating particle aggregation. The preparation of nanoparticles from solutions is a critical step in numerous processes across many industries including, but not limited to processes for forming: pharmaceuticals, nutraceuticals, pesticides, polymer colloids, molecular crystals, and other materials.

Two exemplary prior art spray dryers are shown in FIGS. 1a and 1b and further described in the Technical data sheets for Buchi products "Nano Spray Dryer B-90" and "Mini Spray Dryer B-290" the contents of which are incorporated herein by reference. With respect to FIG. 1a, inlet air 6 (drying gas) is delivered to a heater 1 while droplets are introduced through an ultrasonic spray head at 2. At 3, there is a conductive heat exchange between drying gas and droplets and resulting particles are collected at electrostatic particle collector 4. An outlet filter 5 collects fine particles not collected at 4 to protect the user and environment. With respect to FIG. 1b, the process steps are generally the same as those described in FIG. 1a, except the particle collection at 4 is achieved using cyclone technology which is well known (see, e.g., U.S. Pat. No. 2,911,036 to Lazar et al.)

Prior art spray dryers are not entirely self-contained, thus resulting in the loss of material through venting, safety risks due to release of nanoparticles to the outside, and contamination of sensitive material from outside contaminants. Further, the particle yield suffers due to the fact that there is only a single pass through the collector and as a result of ventilation. There is a need in the art for a self-contained spray dryer to address these issues in the prior art and improve the efficiency, safety and yield of nanoparticles.

SUMMARY OF THE EMBODIMENTS

In a first exemplary embodiment herein, a system for drying liquid-suspended nanoparticles includes: a closed tubing system including an access port for receiving a liquid solution therein, wherein the liquid solution contains suspended nanoparticles therein; a mister for transforming the liquid solution into an aerosol containing droplets, wherein the droplets contain liquid and suspended nanoparticles; a heater for heating a first portion of the closed tubing system, creating an updraft therein, and causing the aerosol to move through at least a second portion of the closed tubing system and further causing the evaporation of at least some liquid from the droplets in the aerosol, thereby leaving dried nanoparticles; and an electrostatic collector comprised of one or more electrodes located in a third portion of the closed tubing system, wherein the dried nanoparticles are collected at the one or more electrodes of the electrostatic collector as the aerosol flows therethrough.

In a second exemplary embodiment, a system for creating dry nanoparticles from a solution includes: a closed tubing system including an access port for receiving the solution therein, wherein the solution contains materials therein for forming nanoparticles; a mister for transforming the solution into an aerosol containing droplets, wherein the droplets contain solvent and the materials therein; a heater for heating a first portion of the closed tubing system, creating an updraft therein, and causing the aerosol to move through at least a second portion of the closed tubing system and further causing the evaporation of at least some liquid from the droplets in the aerosol and formation of dried nanoparticles from the materials; and an electrostatic collector comprised of one or more electrodes located in a third portion of the closed tubing system, wherein the dried nanoparticles are collected at the one or more electrodes of the electrostatic collector as the aerosol flows therethrough.

In a third exemplary embodiment, a process for drying liquid-suspended nanoparticles includes: receiving a liquid solution into a closed tubing system, wherein the liquid solution contains suspended nanoparticles therein; misting the liquid solution into an aerosol containing droplets, wherein the droplets contain liquid and suspended nanoparticles; heating a first portion of the closed tubing system, creating an updraft therein, and causing the aerosol to move through at least a second portion of the closed tubing system and further causing the evaporation of at least some liquid from the droplets in the aerosol, thereby leaving dried nanoparticles; and collecting, by an electrostatic collector comprised of one or more electrodes located in a third portion of the closed tubing system, the dried nanoparticles at the one or more electrodes of the electrostatic collector as the aerosol flows therethrough.

BRIEF SUMMARY OF FIGURES

FIGS. 1a and 1b are schematics of prior art systems;

FIG. 4 is a schematic diagram of nanospray dryer depicting application of a potential in accordance with a first configuration; and FIG. 5 is a schematic diagram of nanospray dryer depicting application of a potential in accordance with a second configuration.

DETAILED DESCRIPTION

Figure 2A:
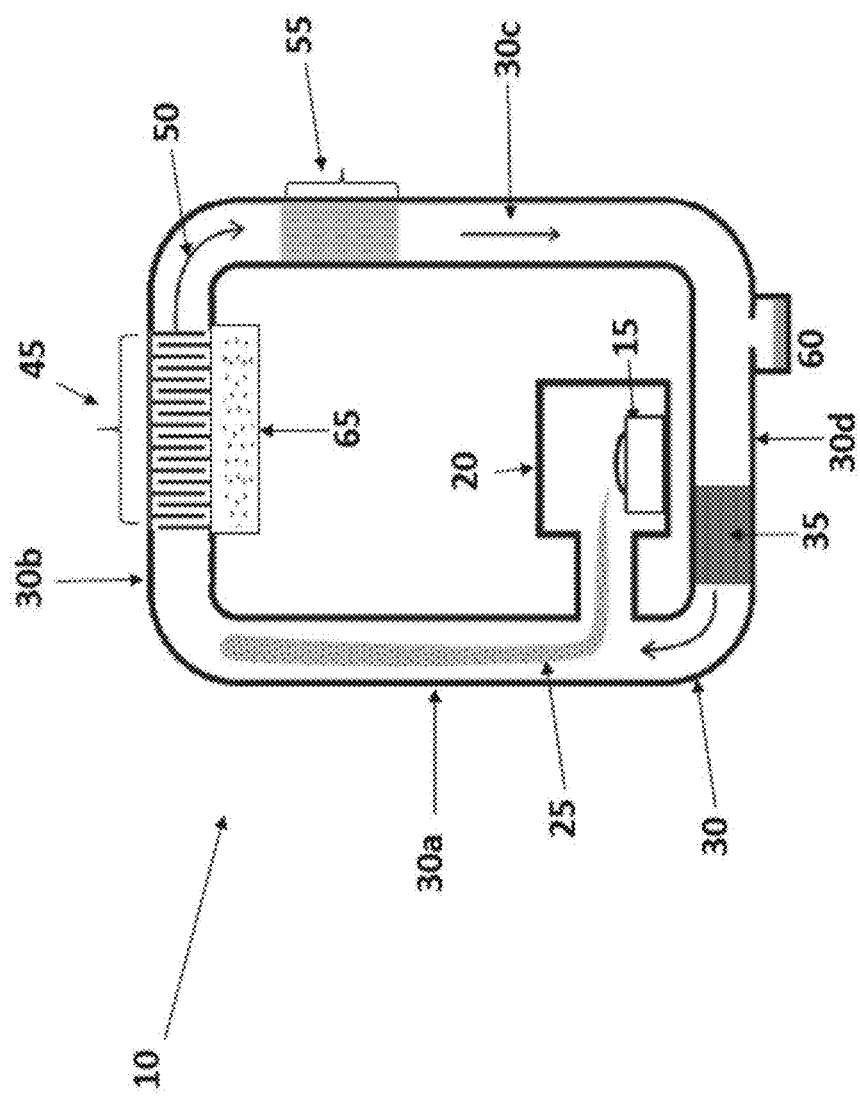
FIGS. 2a and 2b are schematic diagram of nanospray dryer in accordance with an embodiment of the present invention.

In a first preferred embodiment, a liquid solution or suspension (hereafter "liquid") 15 is introduced to a self-contained nanospray dryer 10 of FIG. 2a, either through an automated syringe pump or manually. Here it is first converted to an aerosol or mist by a nebulizer or atomizer (hereafter "mister") 20. For example, the liquid could be an aqueous suspension of polystyrene nanoparticles, or the liquid could include an organic dye perylene dissolved in an organic solvent such as liquid ethanol. One skilled in the art recognizes that the liquid may be selected from numerous aqueous and organic solvents including, but not limited to ethanol, methanol and acetone. Additionally, the nanospray dryers 10 described herein create nanoparticles in two ways. In the first, the particles are already formed, i.e., are suspended in the liquid or solvent. These particles are encapsulated inside the aerosol droplets and collected after drying. In the second method for nanoparticle creation, the aerosol consists of a solution of the desired material, i.e., the material is completely dissolved in the solvent, and the material in each aerosol droplet forms the nanoparticle as it dries. Nanoparticles as referenced herein generally refers to a size of the resulting dried and collected particles of less than 1000 nm and may include: nanocrystals, nanofibers, nanotubes, nanobeads, and nanoclusters.

The mister 20 may be an ultrasonic wave nebulizer, which uses a high frequency ultrasonic wave to form aerosol droplets from the liquid. Alternatively, a nebulizer based on vibrating mesh technology could also be used. The resulting aerosol 25 consists of liquid droplets with sizes on the order of approximately 0.1 to 100 microns. These droplets can contain suspended solid particles or a solution which will later form the solid particles. The mister 20 may also be one of the various apparatuses available for generating aerosols or mists, including atomizer nozzles and electrospray generators.

These droplets are carried to the recirculating tube 30. The tube can be made of metal, plastic or glass, and the inner surface can be treated or coated, for example, with Teflon™, to minimize adsorption of aerosol droplets or nanoparticles. The tube 30 is completely sealed in a closed loop. The droplets are carried through the left vertical section of the tube 30a by convection updraft caused by a heating unit 35. The heating unit 35 may be an infrared lamp for heating a portion of the metal tubing or a portion of metal in contact with a hotplate, or an electrical heating unit inside the tube. Heater selection is not so critical as the requirement that the internal temperature of the recirculating tube not exceed 50 degrees Celsius to avoid degradation of the nanoparticles. In most cases, there is complete drying of the aerosol particles, due to the heat in the tube, over distances of less than 1 meter. Accordingly, depending on the dimensions of the recirculating tube 30, the water or solvent in which the particles or solute are suspended or dissolved will likely have evaporated due to the heater, shortly after entering the top horizontal section 30b and prior to reaching the collector 45, leaving only nanoparticles ranging in size from 1 to 1000 nanometers. By way of example only, 10 cm diameter tubing has been implemented on one or more of the exemplary embodiments.

Next, the nanoparticles are collected by an electrostatic collector 45 located within section 30b. It has been determined that while the nanoparticles are naturally charged during the original aerosol formation, depending on the structure of the electrostatic collector 45, large electric fields between electrodes of the electrostatic collector 45 induce electric dipoles in the nanoparticles, which are then attracted to one of the electrodes due to the inhomogeneous field. Fields on the order of $2.0 \times 10^5$ V/m to $2.5 \times 10^5$ V/m may be most effective in collecting particles without causing a corona discharge at the electrodes, which could possibly damage the nanoparticles. An exemplary electrostatic collector 45 useful in the first preferred embodiment is a set of interdigitated electrodes formed using a series of oppositely charge plates. Using the recirculating process described herein, wherein the nanoparticles may make multiple passes through the tube 30, it has been shown that in a single pass through the device, a collection rate of 40% could be achieved with the interdigitated electrodes. For 10 passes, we estimate that a 99% collection rate could be achieved with the interdigitated electrodes, provided that any possible inefficiencies are sufficiently reduced, such as adsorption of particles on the tube walls 30 or moisture trap 60.

Alternatively, one skilled in the art recognizes that other electrostatic collector configurations may also be contemplated, including dual plate electrodes located within the tube, multiple parallel collector plates, as well as collectors based on the generation of a radial electric field using rod/cylindrical collector plates designs. A key driving factor with respect to the configuration of the electrostatic collector is the requirement for generation of a large enough electric field to induce electric dipoles in the nanoparticles, while avoiding corona discharge, to facilitate attraction to the collector electrodes.

Figure 2B:
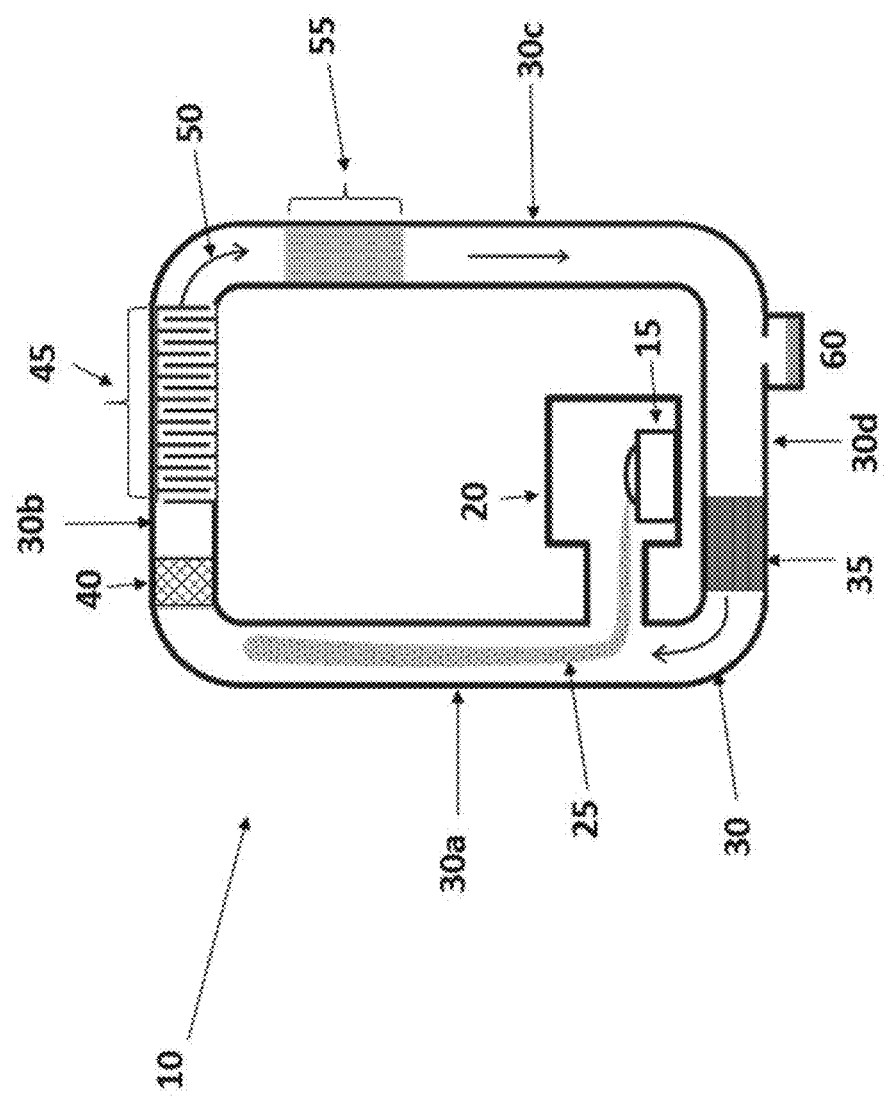

FIG. 2b illustrates a slightly different configuration, wherein the droplets pass through a charging grid 40, prior to reaching the electrostatic collector 45, which is held at a high enough electric potential to induce a corona discharge and charge the aerosol droplets. As in FIG. 2a, the charged nanoparticles are then collected on an electrostatic collector 45 wherein a potential applied thereto is of opposite polarity as that applied to the charging grid 40. The electrostatic interaction causes the particles to collect on the charged plates 45.

Further to the configurations in both FIGS. 2a and 2b, the air flow 50 continues down the tube on the right side 30c, where it is cooled in order to allow any remaining water/solvent vapor to condense and be collected at the moisture trap 60 along the bottom tube section 30d. This cooling can be natural or aided by either an external or internal cooling element 55 located on the right side of the tube, i.e., opposite the heating side of the tube 30. In order to enhance the evaporation rate, the initial liquid may be heated, and a desiccant can be included in the recirculating path in order to remove moisture. Depending on the number of passes the air flow 50 has made through the tube 30, the air flow 50 contains varying amounts of remaining liquid/solvent and/or nanoparticles. Nanoparticles that have not been trapped by the collection plates 45 will continue to circulate through the tube 30 and be trapped on subsequent passes, thus increasing yield.

Once the spray drying is complete, in a first exemplary embodiment, the collector plates 45 can be physically removed from the system through an access hatch or equivalent thereof in order to retrieve the nanoparticle sample. A reverse potential and/or mechanical vibrations may be applied to the collection plate in order to help dislodge the particles. Alternatively, it is further contemplated that a reverse potential and/or mechanical vibration may be applied to the collector plates 45 without requiring removal from the tubing 30. In this alternative arrangement, a nanoparticle trap 65 may be incorporated into the system 10.

Accordingly, the enclosed dryer 10 mitigates the danger of nanoparticles being released into the atmosphere and reduces contamination of the sample from outside contaminants. Further, the recirculation of air flow containing particles will increase the yield of nanoparticles obtained.

Figure 3:
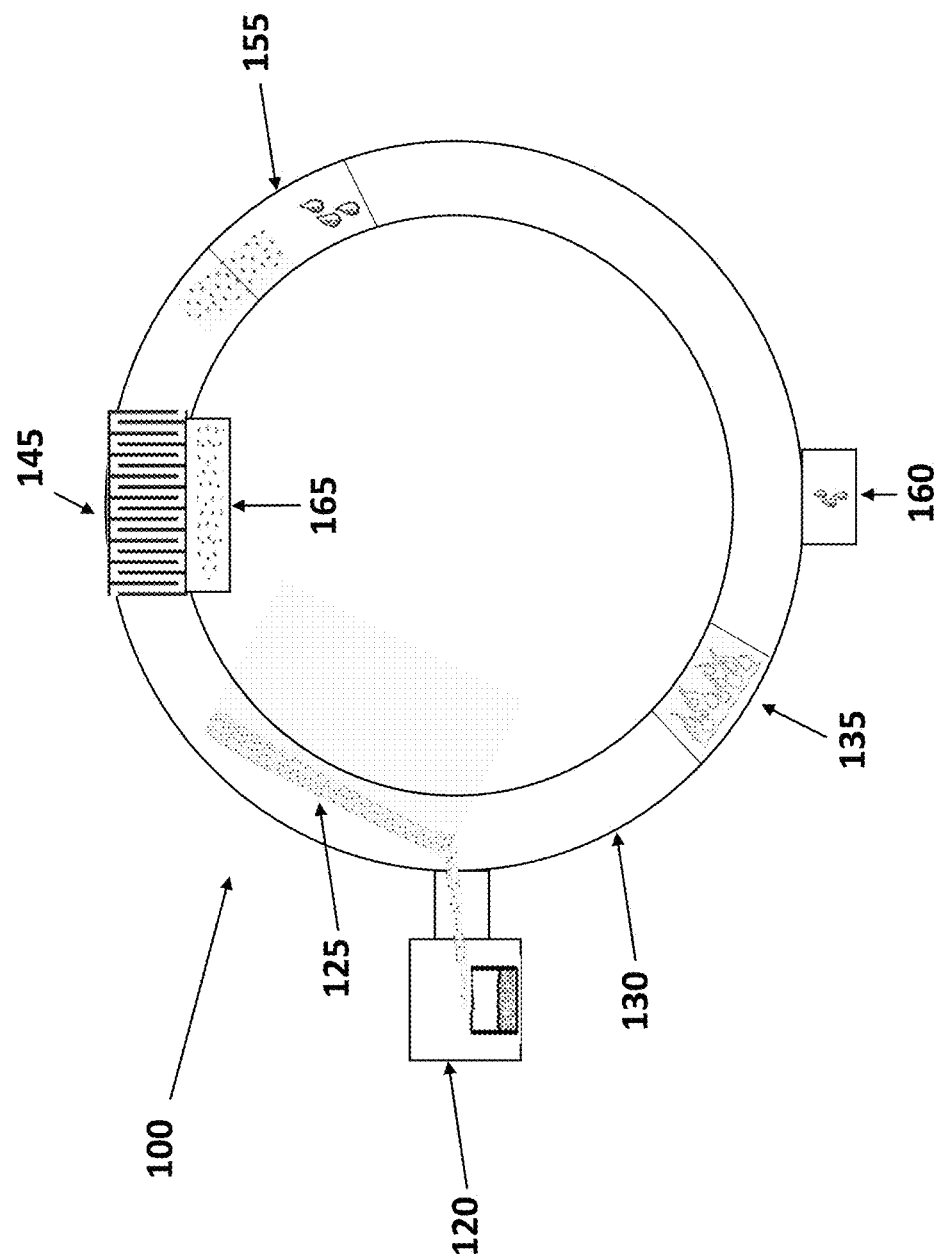
FIG. 3 is a schematic diagram of nanospray dryer in accordance with an embodiment of the present invention.

Although the shape of tubing 30 is shown in FIGS. 2a and 2b to be rectangular, the embodiments are not so limited. Referring to FIG. 3, an alternative configuration illustrates a dryer 100 having a circular tube 130. Additionally, FIG. 3 also illustrates that the nebulizer (or other droplet forming apparatus) 120 may access the tube 130 from outside the circumference of the tube 130 (as compared to the inside access illustrated in FIGS. 2a and 2b).

In alternative embodiments, additional electrostatic control of nanoparticles within the tube 30 may be achieved, as needed, through the use of one or both of:
1. Application of an electric potential 70 to one or more sections of tube 30 that is of the same polarity to the charge on the particles in order to keep the particles from accumulating on the walls of tube 30, as shown in FIG. 4.
2. Application of pulsed electric fields at periodic intervals around the path of the particles through tube 30 to control their motion toward the electrostatic collector plates 45, as shown in FIG. 5. The potentials can be applied directly to the tube or applied to metal bands 80 surrounding the tube at intervals.

These electric potentials, as well as those applied to the charging grid and collector plates, are supplied by (high) voltage power supplies external to the drying unit and connected via insulated copper wire.

One or more of the embodiments described herein has formed nanoparticles from solutions having initial concentrations of up to 14.6 millimolar (mM), producing particles with sizes on the order of 500 nm in radius. One skilled in the art will appreciate that particle size may be controlled through variance of the initial solution concentration. For particles that were already in solution, concentrations up to 11.3 mg/ml have been successfully used for spray drying, but one skilled in the art will appreciate that higher concentrations are achievable with one or more of the system embodiments described herein.

One skilled in the art will understand the various specific components, e.g., product types and substitutes therefor, which may be used to achieve heating, cooling, charging and the like. Additionally, one skilled in the art will recognize various types of tubing that may be used. Further, scaling of the system is within the knowledge of those skilled in the art. These variations are considered to be within the scope of the invention.

The invention claimed is:

1. A process for drying liquid-suspended nanoparticles comprising:
   receiving a liquid solution into a closed tubing system, wherein the liquid solution contains suspended nanoparticles therein;
   misting the liquid solution into an aerosol containing droplets, wherein the droplets contain liquid and suspended nanoparticles;
   heating a first portion of the closed tubing system, creating an updraft therein, and causing the aerosol to move through at least a second portion of the closed tubing system and further causing the evaporation of at least some liquid from the droplets in the aerosol, thereby leaving dried nanoparticles; and
   collecting, by an electrostatic collector comprised of one or more electrodes located in a third portion of the closed tubing system, the dried nanoparticles at the one or more electrodes of the electrostatic collector as the aerosol flows therethrough.

2. The process according to claim 1, wherein the heating a first portion of the closed tubing system further comprises heating to a temperature within the closed tubing system equal to or less than 50 degrees Celsius.

3. The process according to claim 1, further comprising recirculating any remaining aerosol through the closed tubing at least one additional time and collecting any additional dried nanoparticles therefrom at the electrostatic collector.

4. The process according to claim 1, further comprising receiving any remaining aerosol in a fourth portion of the closed tubing for cooling therein wherein any additional moisture generated from cooling is caught in a moisture trap at the end of the fourth portion of the closed tubing.

5. The process according to claim 3, further comprising receiving any remaining aerosol in a fourth portion of the closed tubing for cooling therein after the at least one additional recirculation, wherein any additional moisture generated from cooling is caught in a moisture trap at the end of the fourth portion of the closed tubing.

6. A process for drying liquid-suspended nanoparticles comprising:
   receiving a liquid solution into a closed tubing system, wherein the liquid solution contains suspended nanoparticles therein;
   misting the liquid solution into an aerosol containing droplets, wherein the droplets contain liquid and suspended nanoparticles;
   heating a first portion of the closed tubing system, creating an updraft therein, and causing the aerosol to move through at least a second portion of the closed tubing system and further causing the evaporation of at least some liquid from the droplets in the aerosol, thereby leaving dried nanoparticles;
   passing the aerosol through a charging grid for charging the aerosol droplets; and
   collecting, by an electrostatic collector comprised of one or more electrodes located in a third portion of the closed tubing system, the dried nanoparticles at the one or more electrodes of the electrostatic collector as the aerosol flows therethrough.

7. The process according to claim 6, wherein the heating a first portion of the closed tubing system further comprises heating to a temperature within the closed tubing system equal to or less than 50 degrees Celsius.

8. The process according to claim 6, further comprising recirculating any remaining aerosol through the closed tubing at least one additional time and collecting any additional dried nanoparticles therefrom at the electrostatic collector.

9. The process according to claim 6, further comprising receiving any remaining aerosol in a fourth portion of the closed tubing for cooling therein wherein any additional moisture generated from cooling is caught in a moisture trap at the end of the fourth portion of the closed tubing.

10. The process according to claim 8, further comprising receiving any remaining aerosol in a fourth portion of the closed tubing for cooling therein after the at least one additional recirculation, wherein any additional moisture generated from cooling is caught in a moisture trap at the end of the fourth portion of the closed tubing.

11. The process according to claim 6, comprising applying a first potential to the charging grid and applying a second potential to the electrostatic grid, where in the first and second potential are opposite in polarity.

12. A process for drying liquid-suspended nanoparticles and collecting dried nanoparticles comprising:
  receiving a liquid solution into a closed tubing system, wherein the liquid solution contains suspended nanoparticles therein;
  misting the liquid solution into an aerosol containing droplets, wherein the droplets contain liquid and suspended nanoparticles;
  heating a first portion of the closed tubing system, creating an updraft therein, and causing the aerosol to move through at least a second portion of the closed tubing system and further causing the evaporation of at least some liquid from the droplets in the aerosol, thereby leaving dried nanoparticles;
  collecting, by an electrostatic collector comprised of one or more charging plates located in a third portion of the closed tubing system, the dried nanoparticles at the one or more charging plates of the electrostatic collector as the aerosol flows therethrough;
  removing the charging plates from the closed tubing system to collect the dried nanoparticles therefrom.

13. The process according to claim 12, wherein the heating a first portion of the closed tubing system further comprises heating to a temperature within the closed tubing system equal to or less than 50 degrees Celsius.

14. The process according to claim 12, further comprising recirculating any remaining aerosol through the closed tubing at least one additional time and collecting any additional dried nanoparticles therefrom at the electrostatic collector.

15. The process according to claim 12, further comprising receiving any remaining aerosol in a fourth portion of the closed tubing for cooling therein wherein any additional moisture generated from cooling is caught in a moisture trap at the end of the fourth portion of the closed tubing.

16. The process according to claim 14, further comprising receiving any remaining aerosol in a fourth portion of the closed tubing for cooling therein after the at least one additional recirculation, wherein any additional moisture generated from cooling is caught in a moisture trap at the end of the fourth portion of the closed tubing.

17. The process according to claim 12, further comprising passing the aerosol through a charging grid for charging the aerosol droplets prior to reaching the electrostatic collector.

18. The process according to claim 17, comprising applying a first potential to the charging grid and applying a second potential to the electrostatic grid, where in the first and second potential are opposite in polarity.

19. The process according to claim 12, further comprising applying a reverse potential to the removed charging plates to dislodge the dried nanoparticles therefrom.

* * * * *